US009979871B2

(12) United States Patent
Kennair, Jr.

(10) Patent No.: US 9,979,871 B2
(45) Date of Patent: May 22, 2018

(54) RADIO-FREQUENCY TRIGGER SIGNAL SYSTEM APPARATUS AND METHOD

(71) Applicant: Donald Kennair, Jr., Belle Chasse, LA (US)

(72) Inventor: Donald Kennair, Jr., Belle Chasse, LA (US)

( * ) Notice: Subject to any disclaimer, the term of this patent is extended or adjusted under 35 U.S.C. 154(b) by 261 days.

(21) Appl. No.: 15/059,427

(22) Filed: Mar. 3, 2016

(65) Prior Publication Data

US 2017/0257552 A1     Sep. 7, 2017

(51) Int. Cl.
*H04N 5/232*     (2006.01)
*H04N 7/18*      (2006.01)
*F41A 19/09*     (2006.01)

(52) U.S. Cl.
CPC ......... *H04N 5/23203* (2013.01); *F41A 19/09* (2013.01); *H04N 7/181* (2013.01); *H04N 7/188* (2013.01)

(58) Field of Classification Search
CPC .... F41A 19/09; H04N 5/23203; H04N 7/181; H04N 7/188
USPC ....................................................... 348/159
See application file for complete search history.

(56) References Cited

U.S. PATENT DOCUMENTS

| 5,685,105 A | 11/1997 | Teetzel |
| 6,230,431 B1 | 5/2001 | Bear |
| 8,904,698 B2 | 12/2014 | Casas |
| 9,188,407 B2 | 11/2015 | Moore et al. |
| 9,222,743 B1 | 12/2015 | Shah et al. |
| 2005/0179799 A1 | 8/2005 | Umanskiy et al. |
| 2006/0082730 A1 | 4/2006 | Franks |
| 2008/0060246 A1 | 3/2008 | Rozoyvsky |
| 2008/0112698 A1 | 5/2008 | Ray |
| 2008/0233543 A1 | 9/2008 | Guissin |
| 2010/0095574 A1 | 4/2010 | Abst |
| 2015/0113851 A1 | 4/2015 | Bensayan et al. |
| 2015/0176937 A1 | 6/2015 | Sullivan et al. |
| 2015/0198406 A1 | 7/2015 | Ling |
| 2016/0021329 A1 | 1/2016 | Sakiewicz et al. |
| 2016/0165192 A1 | 6/2016 | Saatchi et al. |
| 2016/0241807 A1 | 8/2016 | Kovac |

*Primary Examiner* — Francis G Geroleo
(74) *Attorney, Agent, or Firm* — Keaty Law Firm, LLC

(57) ABSTRACT

A radio-frequency trigger signal system apparatus and method for transmitting a radio-frequency signal coordinated with the pulling of a trigger on a weapon such as a firearm, causing cameras on the weapon, the shooter's person, nearby persons or vehicles, and nearby fixed-position cameras to activate, if needed, to flag photographs and videos taken, and optionally to log and notify an appropriate authority of the pulling of the trigger.

20 Claims, 4 Drawing Sheets

RADIO-FREQUENCY TRIGGER SIGNAL SYSTEM APPARATUS AND METHOD

BACKGROUND OF THE INVENTION

The present invention provides a radio-frequency trigger signal system apparatus and method transmitting a radio-frequency signal coordinated with the pulling of a trigger on a weapon such as a firearm, causing cameras on the weapon, on the shooter's person, on nearby persons or vehicles, and nearby fixed-position cameras to activate, if needed, to flag photographs and videos taken, and optionally to log and notify an appropriate authority of the pulling of the trigger.

In law enforcement, every discharge, and even near-discharges, of a weapon such as a firearm, stun gun, or the like, is subject to review, certainly internally and possibly to the public. A variety of fixed and portable cameras, including firearm-mounted cameras, are available and are in place. These cameras are under both public and private control. In today's society, everyone with a smartphone is carrying a camera, and many homes and businesses have recording security cameras. But there is presently a lack of any system for ensuring that any given camera captures a nearby discharge or near-discharge of a weapon, and even when such events are captured by a nearby private camera, the camera owner might not be aware of it, might not be aware of a law-enforcement request for relevant photos and video, or might not ultimately check the footage of the camera for the relevant photos or video. Even cameras under law-enforcement control are vulnerable to having their contents overlooked or overwritten.

There is a need for a system to ensure that every discharge, and possibly near-discharges, of firearms and weapons is captured by every available nearby camera, and that such photos and video are flagged so they may be identified and its destruction may thereby be prevented.

SUMMARY OF THE INVENTION

The present invention is a radio-frequency trigger signal system apparatus and method that transmits a radio-frequency signal coordinated with the pulling of a trigger on a weapon such as a firearm, causing cameras on the weapon, on the shooter's person, on nearby persons or vehicles, and nearby fixed-position cameras to activate, if needed, to flag photographs and videos taken, and optionally to log and notify an appropriate authority of the pulling of the trigger.

This invention helps solve the problems associated with not having more complete information about circumstances surrounding the discharge of weapons

BRIEF DESCRIPTION OF DRAWINGS

Reference will now be made to the drawings, wherein like parts are designated by like numerals, and wherein.

DETAILED DESCRIPTION OF THE INVENTION

Figure 1:
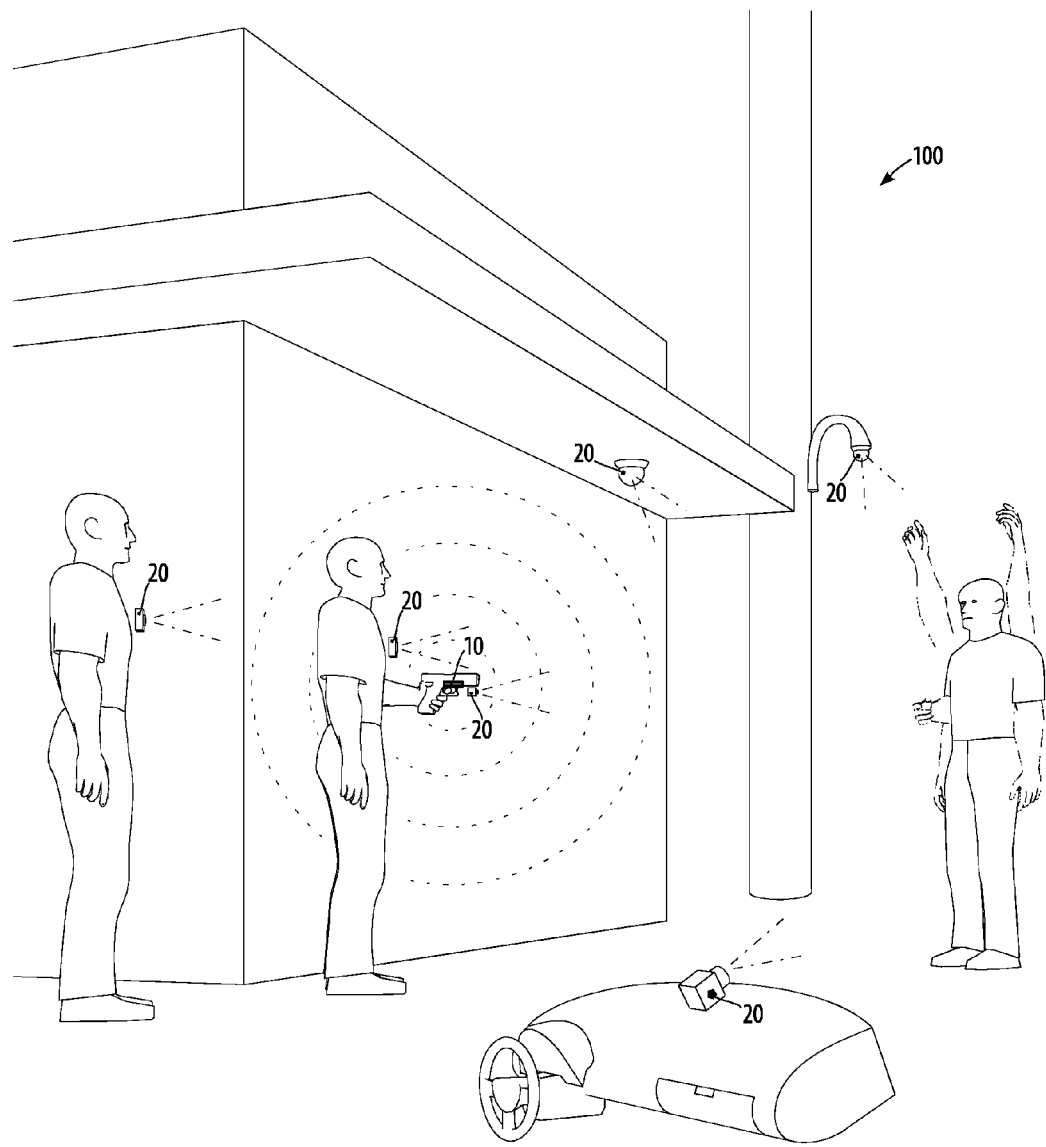
FIG. 1 is a schematic view of the radio-frequency trigger signal system in use by law-enforcement personnel.

Referring to FIG. 1 and the other figures generally, the radio-frequency trigger signal system method and apparatus 100 are shown schematically in use, in a law-enforcement scenario with two law officers confronting a person, where one law officer has a firearm ready to shoot, and there will likely be a question about the appearance and actions of the confronted person. The law officers are both wearing cameras, the firearm has a mounted camera, the vehicle has a camera mounted on the dashboard, a nearby utility pole has an observation camera mounted, and a nearby private home or business also has an observation or security camera mounted.

The radio-frequency trigger signal system method and apparatus 100 provides a signal-transmitting unit 10 affixed onto or into the firearm, and several signal-receiving units 20, one each in the various cameras. Upon the pulling of the trigger of the firearm, a radio-frequency signal is transmitted or broadcast from the signal-transmitting unit 10 and is received by the signal-receiving units 20 affixed onto or into the various nearby cameras. Each signal-receiving unit 20 activates its associated camera to begin capturing photos or videos, if the camera is not already activated. Each signal-receiving unit 20 also flags the photos or videos captured by a camera at the time of the trigger pull. This flagging identifies the relevant photos and video segments for fast retrieval, and locks those portions against accidental or intentional erasure. Optionally, one or more of the cameras, if it has telecommunications capabilities, can notify an appropriate authority about the trigger pull, and optionally can upload the flagged photos or video. In the FIG. 1 scenario, the observation camera on the utility pole is likely to be under the control of a governmental authority, and is likely to have a permanent wired or wireless communication link with the authority, and would therefore be the most likely camera to have the optional ability to notify the authority in real time. If the signal-receiving unit 20 of this invention is made available to private homes and businesses, then such private parties could be notified that they have flagged photos and videos that are likely to be of interest to law enforcement, leaving the communication up to the private party, or the private party could choose and agree to have its system make an automatic notification or an automatic upload.

In a military or law-enforcement scenario, where an authority has the means to install a signal-transmitting unit 10 on every firearm, stun gun, or other weapon, and install a signal-receiving unit 20 in every body-cam, dash-cam, or weapon-mounted camera, and probably on public observation cameras as well, the system of this invention can provide essentially complete coverage of all trigger-pull incidents of personnel under the control of that authority.

Figure 5:
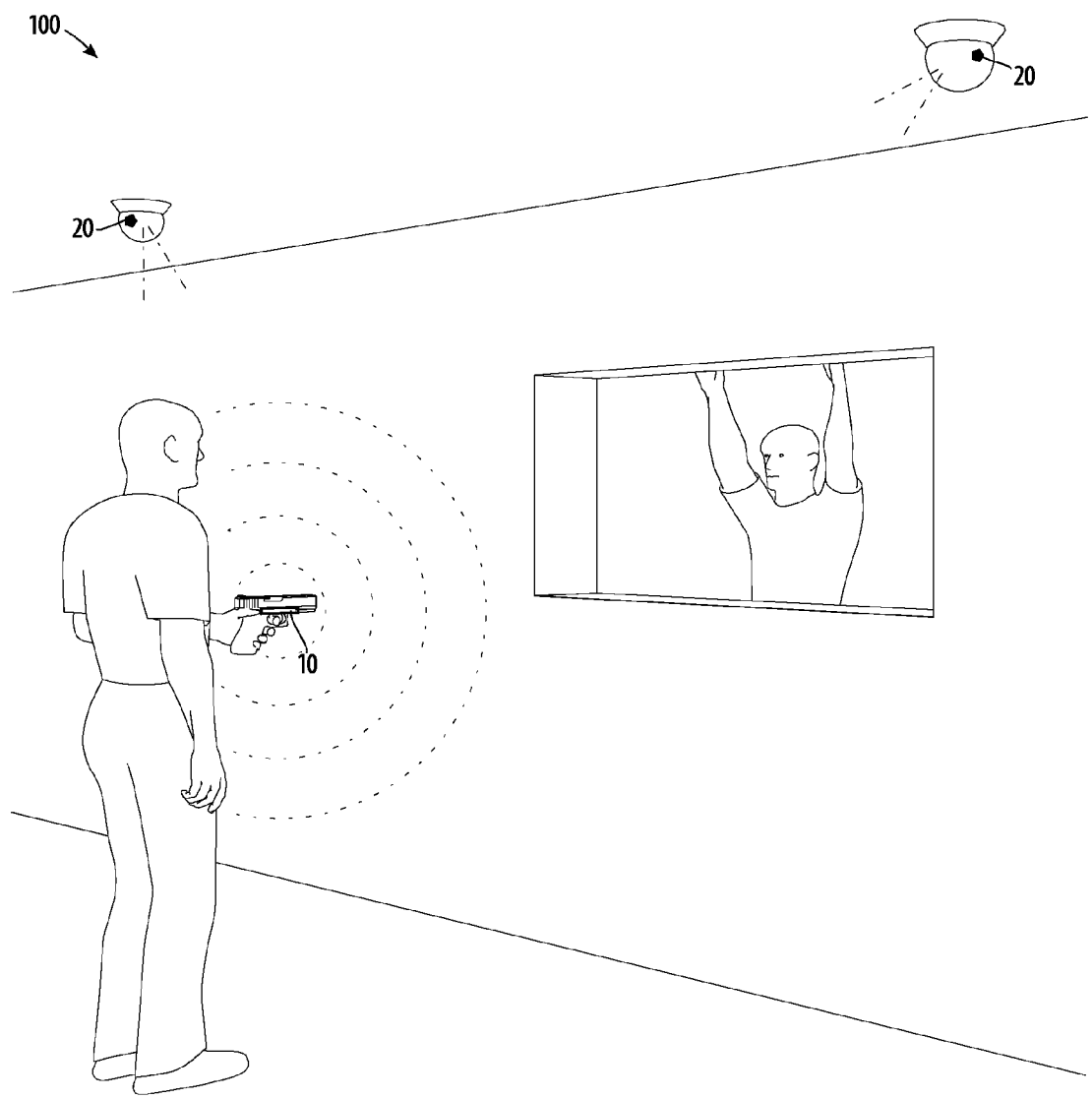
FIG. 5 is a schematic view of an embodiment of the radio-frequency trigger signal system in use during a crime.

Referring briefly to FIG. 5, schematically showing an armed-robbery scenario, the robber's firearm has a signal-transmitting unit 10 which activates the signal-receiving units 20 of the premise's security cameras. For this scenario to work in practice, all firearms would have to be equipped with a signal-transmitting unit 10, probably at the time of manufacture and as a compulsory retrofit. This would likely require legislation, but would provide a possible solution to private-ownership-of-guns issues. The possession and use of firearms would not be limited by this invention, but each trigger pull in a public space would be automatically, compulsorily self-reporting.

Figure 2:
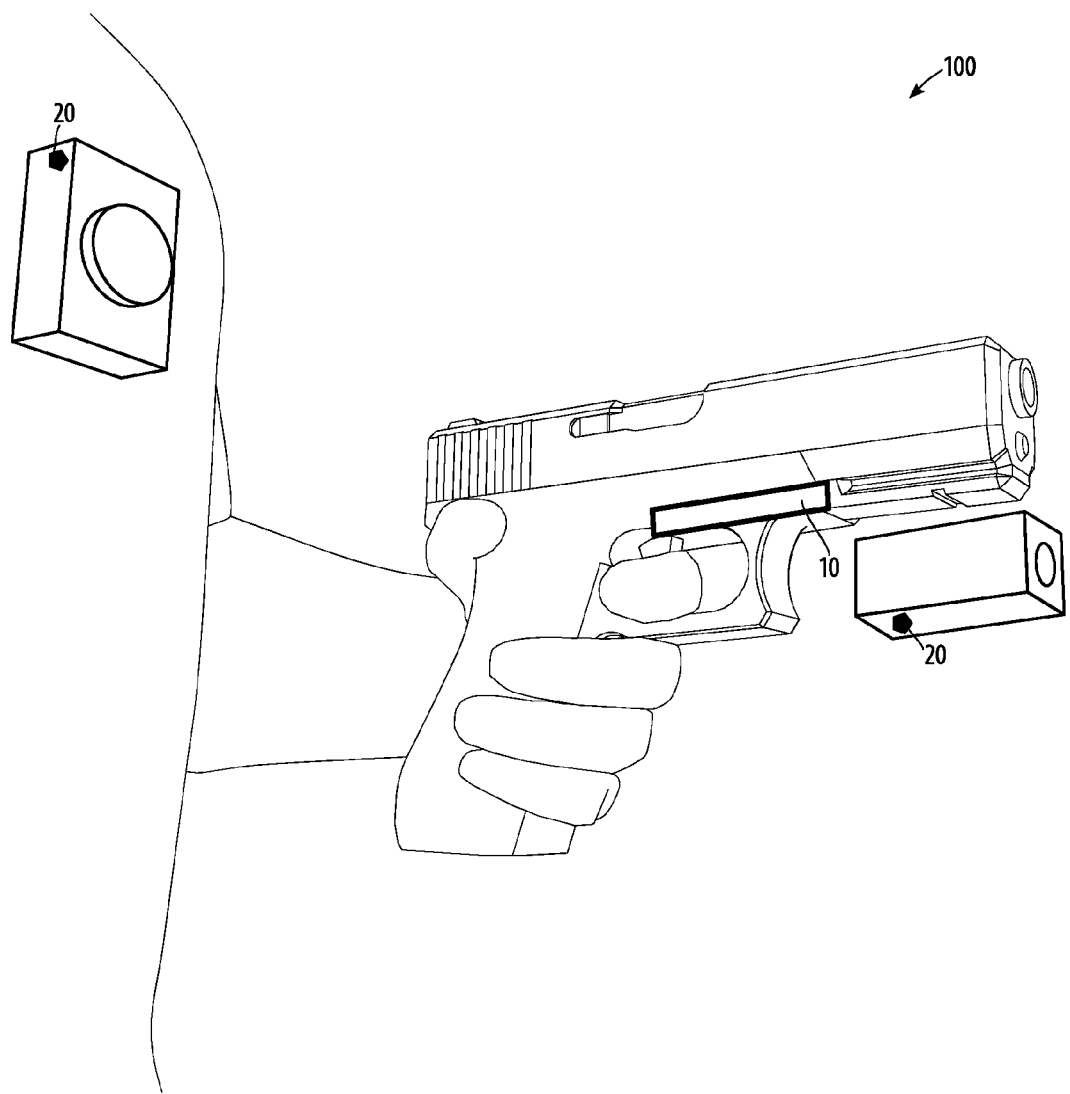
FIG. 2 is a schematic close view of the radio-frequency trigger signal system in use.

FIG. 2 is a closer schematic view of the signal-transmitting unit 10 affixed onto or into an automatic pistol, and signal-receiving units 20 affixed onto or into a pistol-mounted camera and a chest-mounted body camera. In an embodiment of the invention, it can be configured such that only these two cameras, and no others, are activated upon a trigger pull. The basic embodiment of the invention, however, is designed to activate every available camera nearby, or at least every camera controlled by any given authority, such as dash-cams and body-cams of nearby personnel.

Figure 3:
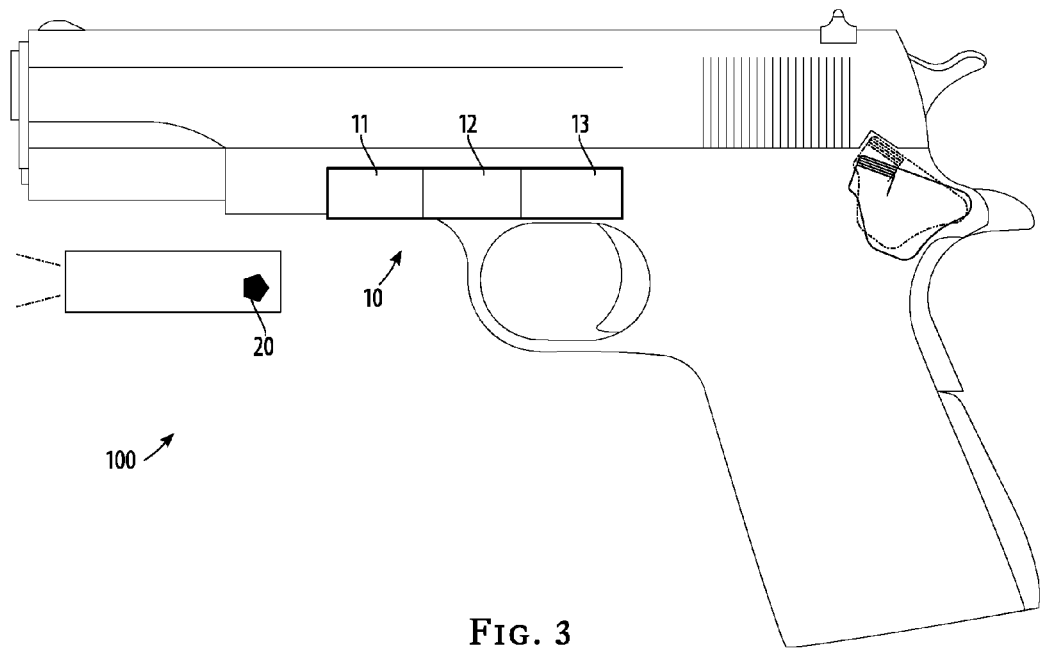
FIG. 3 is a schematic view of an embodiment of the radio-frequency trigger signal system.
Figure 4:
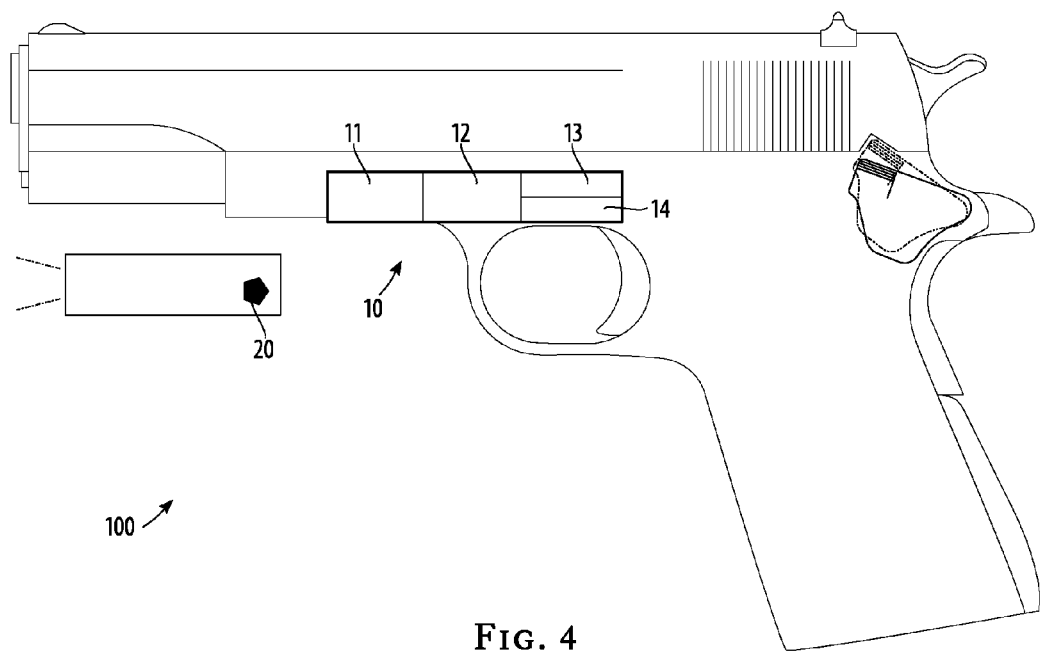
FIG. 4 is a schematic view of another embodiment of the radio-frequency trigger signal system having a trigger lock.

Referring now to FIG. 3 & FIG. 4, more detail of the invention will be given. In the non-impeding embodiment of FIG. 3, the subunits of the signal-transmitting unit 10 are the power source 11, trigger-pull sensor 12, and radio-frequency transmitter 13. In the impeding embodiment of FIG. 4, an additional subunit, a trigger lock 14, is additionally provided.

The power source 11 can be a battery or capacitor capable of storing sufficient energy to drive occasional brief short-range radio-frequency transmissions. The power source should be small and unobtrusive so that it can be incorporated onto or into the weapon easily. Batteries of the type used in watches, hearing aids, and wireless headsets are appropriate. In a firearm having a common power source for distribution to attached auxiliary gear, the common power source can be tapped to act as the power source 11 or as a secondary, backup, or recharging source.

The supplying of power, or activation, of the signal-transmitting unit 10 can be controlled by the safety mechanism of the firearm or one of the safety mechanisms of modern firearms. Disengaging the safety activates the signal-transmitting unit 10. This ensures automatic activation of the signal-transmitting unit 10 before the firearm can possibly be fired, but does not impose and cannot impose any additional limitation on the use of the firearm. Even in the event of a malfunction of the signal-transmitting unit 10, there is no mechanism for the unit to limit the operation of the firearm, in the non-impeding embodiment of the invention. In the impeding embodiment of the invention, a trigger lock 14 mechanism is provided that can positively lock and prevent pulling of the trigger if the signal-transmitting unit 10 is disabled or bypassed.

The trigger-pull sensor 12 activates upon the pulling of the trigger of the weapon by a set predetermined amount. It might be desirable to send a signal upon a slight or moderate pulling of the trigger which does not yet fire the weapon. On the other hand, it might be desirable to send a signal only upon the actual firing of the weapon. Optionally, the invention can be configured to sense the different trigger pulls and to send different signals corresponding to each. The trigger of a firearm is a mechanical, moving unit, and the trigger-pull sensor 12 can sense such movement without touching, impeding, or affecting the action of the trigger in any way, in both the functioning and possible malfunctioning state.

Many modern firearms have trigger modules, sometimes of the drop-in or interchangeable sort. The signal-transmitting unit 10, or at least the trigger-pull sensor 12 subunit, is most sensibly placed near, or even in, the trigger module, so that the mechanical action of the trigger can be sensed. The system of the invention can even be incorporated into trigger modules or into the body of the firearm at the time of manufacture or as a retrofit.

The radio-frequency transmitter 13 subunit of the signal-transmitting unit 10 generates and broadcasts a radio-frequency signal coordinated with the pulling of the trigger and activation of the trigger-pull sensor 12. The signal is only meant to reach nearby signal-receiving units 20, and does not need to be very powerful or very long in duration. The invention can use, for example, the publicly accessible frequencies around 2.4 Gigahertz or 5 Gigahertz. Governmental users of the invention will also have access to other frequency bands. The signal should be encoded so that stray signals do not activate the signal-receiving units 20. Optionally, an encoded identifier representing a group of firearms or specific serialized firearms can be provided, and can be included in the reporting and logging of trigger pulls.

In a camera that is either already recording or is designed to keep at least several seconds of photos or video in a rolling buffer, the invention can capture and flag the moments preceding a trigger-pull event, which are likely to provide additional important information.

Many changes and modifications can be made in the present invention without departing from the spirit thereof. I therefore pray that my rights to the present invention be limited only by the scope of the appended claims.

I claim:

1. A radio-frequency trigger signal apparatus for a weapon having a trigger, comprising:
   (i) a signal-transmitting unit, comprising:
      (a) a power source adapted to fit unobtrusively in or on the weapon and to provide power for occasional brief short-range radio-frequency transmissions;
      (b) a trigger-pull sensor adapted to activate upon a predetermined amount of trigger pull; and
      (c) a radio-frequency transmitter adapted to transmit a brief short-range radio-frequency signal, using power from said power source, upon activation of said trigger-pull sensor; and
   (ii) a plurality of signal-receiving units, each comprising:
      (a) a camera equipped with a radio-frequency receiver, wherein the radio-frequency receiver adapted to receive a signal from said radio-frequency transmitter, and to control the camera by activating the camera if activation is needed, and by flagging photos and videos taken at the time of receipt of the signal;
where the signal from said radio-frequency transmitter causes all cameras within range of the radio-frequency signal and equipped with said radio-frequency receiver to become activated if not already activated, and causes all photos and videos captured by the cameras to be flagged for the purposes of identification and preservation.

2. The radio-frequency trigger signal apparatus of claim 1, where said radio-frequency transmitter is further adapted to include identifying information in the radio-frequency signal.

3. The radio-frequency trigger signal apparatus of claim 1, where at least one said radio-frequency receiver is further adapted to log and relay the signal to an appropriate authority.

4. The radio-frequency trigger signal apparatus of claim 1, where the predetermined amount of trigger pull to activate said trigger-pull sensor is less than the amount needed to fire the weapon.

5. The radio-frequency trigger signal apparatus of claim 1, where the predetermined amount of trigger pull to activate said trigger-pull sensor is essentially equal to the amount needed to fire the weapon.

6. The radio-frequency trigger signal apparatus of claim 1, where said trigger-pull sensor is further adapted to activate in a first mode by an amount of trigger pull less than needed to fire the weapon, and to activate in a second mode by an amount of trigger pull essentially equal to the amount needed to fire the weapon.

7. The radio-frequency trigger signal apparatus of claim 1, where said radio-frequency transmitter is further adapted to transmit a first-mode signal upon first-mode activation of said trigger-pull sensor, and a different second-mode signal upon second mode activation of said trigger-pull sensor.

8. The radio-frequency trigger signal apparatus of claim 1, further comprising a trigger lock adapted to prevent firing of the weapon if said radio-frequency transmitter is rendered inactive.

9. The radio-frequency trigger signal apparatus of claim 1, where said radio-frequency trigger signal apparatus is used by military or law-enforcement personnel.

10. The radio-frequency trigger signal apparatus of claim 1, where said radio-frequency trigger signal apparatus is made mandatory and used to capture unlawful use of weapons.

11. A radio-frequency trigger signal method for weapons having a trigger, comprising:
(i) providing a radio-frequency trigger signal apparatus, comprising:
   (a) a signal-transmitting unit, comprising:
      (1) a power source adapted to fit unobtrusively in or on the weapon and to provide power for occasional brief short-range radio-frequency transmissions;
      (2) a trigger-pull sensor adapted to activate upon a predetermined amount of trigger pull; and
      (3) a radio-frequency transmitter adapted to transmit a brief short-range radio-frequency signal, using power from said power source, upon activation of said trigger-pull sensor; and
   (b) a plurality of signal-receiving units, each comprising:
      (1) a camera equipped with a radio-frequency receiver, wherein the radio-frequency receiver adapted to receive a signal from said radio-frequency transmitter, and to control the camera by activating the camera if activation is needed, and by flagging photos and videos taken at the time of receipt of the signal;
where the signal from said radio-frequency transmitter causes all cameras within range of the radio-frequency signal and equipped with said radio-frequency receiver to become activated if not already activated, and causes all photos and videos captured by the cameras to be flagged for the purposes of identification and preservation; and
(ii) using said radio-frequency trigger signal apparatus for capture and identification of photos and videos relevant to the pulling of the trigger of a weapon.

12. The radio-frequency trigger signal method of claim 11, where said radio-frequency transmitter is further adapted to include identifying information in the radio-frequency signal.

13. The radio-frequency trigger signal method of claim 11, where at least one said radio-frequency receiver is further adapted to log and relay the signal to an appropriate authority.

14. The radio-frequency trigger signal method of claim 11, where the predetermined amount of trigger pull to activate said trigger-pull sensor is less than the amount needed to fire the weapon.

15. The radio-frequency trigger signal method of claim 11, where the predetermined amount of trigger pull to activate said trigger-pull sensor is essentially equal to the amount needed to fire the weapon.

16. The radio-frequency trigger signal method of claim 11, where said trigger-pull sensor is further adapted to activate in a first mode by an amount of trigger pull less than needed to fire the weapon, and to activate in a second mode by an amount of trigger pull essentially equal to the amount needed to fire the weapon.

17. The radio-frequency trigger signal method of claim 11, where said radio-frequency transmitter is further adapted to transmit a first-mode signal upon first-mode activation of said trigger-pull sensor, and a different second-mode signal upon second mode activation of said trigger-pull sensor.

18. The radio-frequency trigger signal method of claim 11, further comprising a trigger lock adapted to prevent firing of the weapon if said radio-frequency transmitter is rendered inactive.

19. The radio-frequency trigger signal method of claim 11, where said radio-frequency trigger signal apparatus is used by military or law-enforcement personnel.

20. The radio-frequency trigger signal method of claim 11, where said radio-frequency trigger signal apparatus is made mandatory and used to capture unlawful use of weapons.

* * * * *